May 5, 1953 G. L. MELLEN 2,637,208
VELOCITY MEASURING BY USE OF HIGH ENERGY ELECTRONS
Filed Nov. 17, 1949 2 SHEETS—SHEET 1

*INVENTOR.*
GLENN L. MELLEN
BY Oliver W. Hayes
ATTORNEY

May 5, 1953  G. L. MELLEN  2,637,208
VELOCITY MEASURING BY USE OF HIGH ENERGY ELECTRONS
Filed Nov. 17, 1949  2 SHEETS—SHEET 2
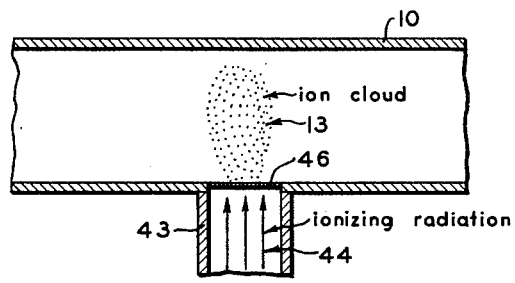
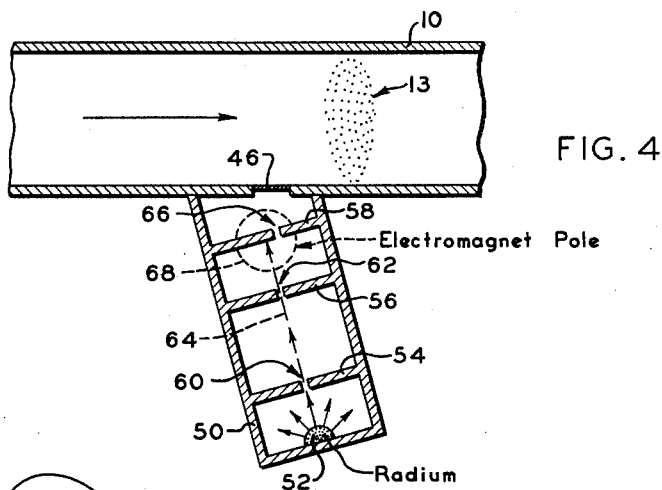
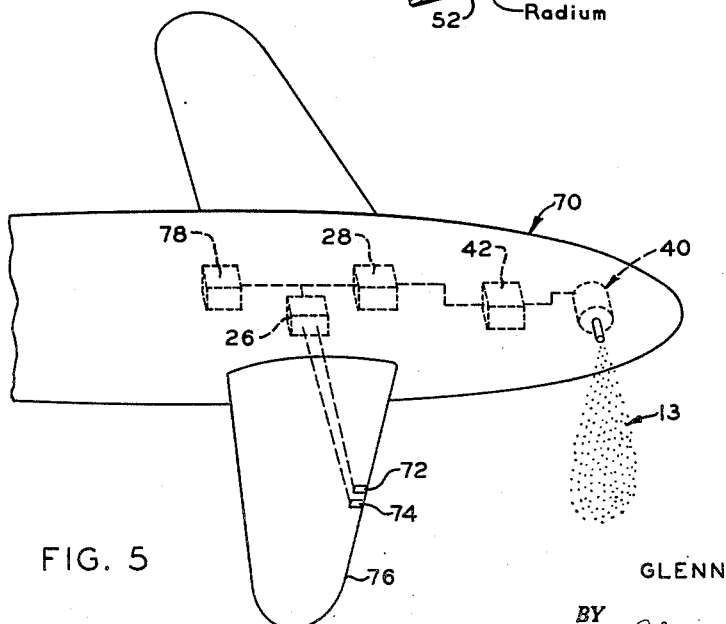
INVENTOR.
GLENN L. MELLEN
BY Oliver W. Hayes
ATTORNEY Patented May 5, 1953

2,637,208

UNITED STATES PATENT OFFICE 2,637,208

VELOCITY MEASURING BY USE OF HIGH ENERGY ELECTRONS

Glenn L. Mellen, Framingham Center, Mass., assignor to National Research Corporation, Middlesex County, Mass., a corporation of Massachusetts Application November 17, 1949, Serial No. 127,944

2 Claims. (Cl. 73—194)

This invention relates to velocity measuring methods and apparatus and has for its main object the provision of measuring apparatus for measuring the rate of relative movement between an object and a gas at speeds up to and including supersonic speeds.

Another object of the present invention is to provide an improved apparatus for measuring such relative velocity, said apparatus being susceptible of a wide number of uses, and being operable over a wide range of relative velocities.

Still another object of the present invention is to provide velocity measuring apparatus which operates with a minimum effect upon the gas flow, and which is capable of extremely rapid indications of changes in the relative velocity being measured.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is an enlarged sectional view of a portion of the apparatus of Fig. 2;

Fig. 4 is a diagrammatic, fragmentary view showing a modified source of ionizing energy; and Fig. 5 is a diagrammatic view showing the use of the invention for measuring the speed of a projectile or the like.

The present invention relates primarily to the measuring of relative velocity between an object and a gas, for example the measuring of the velocity of air through a wind tunnel, or the velocity of a projectile through air. For simplicity of description, the invention will first be discussed in connection with the measuring of velocity of flow of gas through a pipe.

In the present invention there are provided two stations spaced a predetermined distance apart along the path of flow of the gas. The first of these stations includes a means for introducing ionizing energy into the gas stream for a short period of time to create a cloud of ions in the gas stream. The second station includes a means for detecting the ion cloud created at the first station. The time during which the cloud of ions is created is preferably considerably less than the transit time of the ion cloud from the first station to the second station at the maximum speed of gas flow to be measured. The apparatus also preferably includes a means for amplifying ion currents that constitute the ion clouds detected at the second station, and a means controlled by the amplified currents for affecting the first station to cause the creation of a second cloud of ions. Thus the detection of one cloud of ions accomplishes the creation of a second cloud of ions. The frequency with which these clouds of ions are created is thus a function of the speed of the flow of gas, and the apparatus includes a means for measuring this frequency.

Figure 1:
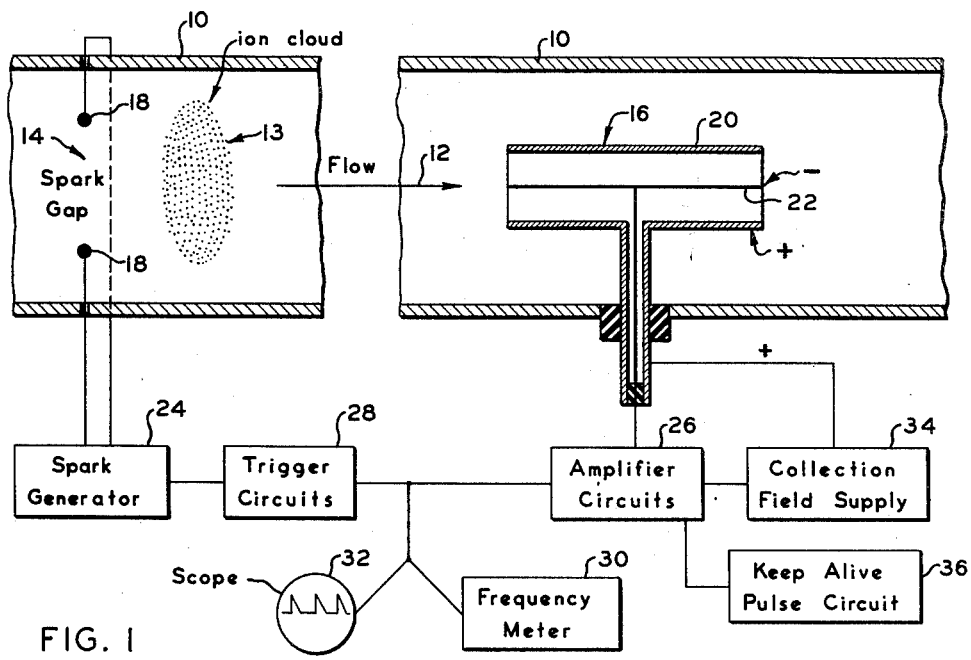
Fig. 1 is an exaggerated, diagrammatic, partially sectional view of one embodiment of the invention as applied to measuring gas flow through a pipe.

Referring now to Fig. 1, the apparatus is shown as including a pipe, such as a wind tunnel 10, through which a body of gas, such as air, is adapted to flow in the direction indicated by the arrow 12. A cloud of ions created in this flowing gas is indicated at 13, this ion cloud having been created as a result of an electrical discharge across a spark gap 14. For detecting the ion cloud, there is provided a detector generally indicated at 16 and comprising an outer tubular electrode 20 supporting therewithin an inner coaxial electrode 22. For providing the ionizing energy, there is included a spark generator 24 which applies a sufficiently high voltage between a pair of electrodes 18 in the spark gap 14 to cause a spark discharge thereacross.

The ion current created in the detector 16, as a result of the collection of an ion cloud 13 thereby, is amplified by means of an amplifying circuit 26, the output of this amplifying circuit 26 being fed to a trigger circuit 28. This output is also fed to a frequency meter 30 and an oscilloscope 32. The output of trigger circuit 28 is, in turn, fed to the spark generator 24 for actuating this spark generator. The circuit illustrated in Fig. 1 also includes a voltage supply for the ion cloud detector 16, this voltage supply being indicated at 34. A "keep alive" pulse circuit, indicated at 36, is also provided, the function of this circuit 36 being described in more detail hereinafter.

In the operation of the device of Fig. 1, the spark generator 24 is energized either by the "keep alive" pulse circuit 36, or by manual operation so as to cause a spark discharge between the electrodes 18 in the spark gap. The time of the spark discharge is preferably of a very short length, such for example as 1 microsecond. This spark discharge accomplishes an ionization of a part of the gas flowing between the electrodes 18 at the time of the discharge, the mass of gas thus ionized flowing along the pipe 10 as a cloud of ions. When a portion of this ion cloud enters the outer electrode 20 of the detector 16, there is a current flow between the inner negative electrode 22 and the outer positive electrode 20 thereof. This current flow is amplified by the amplifying circuit 26, the output of this amplifying circuit 26 actuating the trigger circuit 28 to cause the spark generator 24 to create another spark discharge across the spark gap 14. The frequency with which these ion clouds are created can readily be determined visually on the oscilloscope 32 or on the frequency meter 30. Either or both of these indicating means can be calibrated directly in terms of velocity of flow of the gas within the pipe 10.

The frequency of creation of ion clouds can be directly converted into velocity of gas flow through the pipe by using the following formula:

$$V = \frac{60}{88} FD$$

wherein V is velocity in miles per hour, D is the distance in feet between the point of ion cloud creation and the point of ion cloud detection, and F is the frequency in cycles per second.

The "keep alive" pulse circuit 36 is for the purpose of triggering the system in case an ion cloud passes the detector without creating a sufficient current to actuate the circuits to form a second ion cloud. This "keep alive" circuit 36 is preferably timed to give a very low frequency pulse, for example 1 pulse per second. This permits the "keep alive" pulse to trigger the system once a second, this additional triggering having no appreciable effect upon the system unless the frequency of the triggering of the system due to measuring velocity is at a very low value. Since this latter frequency is usually made quite high, i. e., on the order of 50 cycles per second even at low (i. e. 34 m. p. h.) velocities (with $D=1$ foot), the percentage error is small even at the lowest velocities. At the high velocities the percentage error can be ignored.

Figure 2:
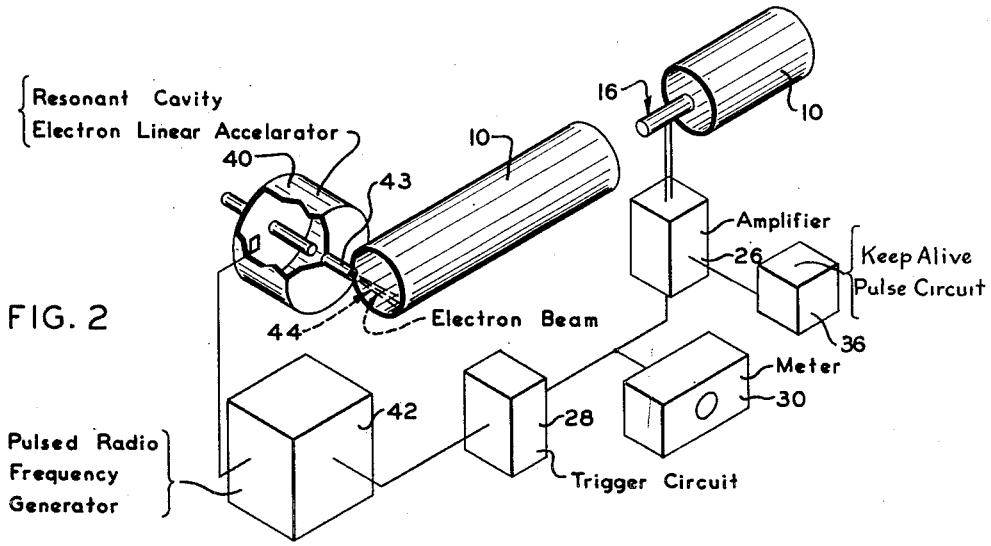
Fig. 2 is an exaggerated, diagrammatic, isometric view of another embodiment of the invention, parts of the apparatus of Fig. 2 being cut away for clarity of illustration.

In a modification of the invention shown in Figs. 2 and 3, there is provided an apparatus which is particularly adaptable for use where extremely high velocities of gases are to be measured, such for example as in the supersonic range. The apparatus of Figs. 2 and 3 has the advantage that no element need extend into the path of gas flow at the point of creation of the ion cloud. This aspect of the invention is particularly important where extremely high rates of flow are involved, since no turbulence in the flow of gases is created by the structure which accomplishes the formation of the ion clouds. In Figs. 2 and 3 like numbers refer to like elements in Fig. 1, the apparatus being very similar to the Fig. 1 form of the embodiment with the exception that there is provided a source of high energy electrons rather than a spark gap for introducing the ionizing energy into the flowing gas stream.

In a preferred form of the invention shown in Figs. 2 and 3, this source of high energy electrons comprises a resonant cavity electron linear accelerator 40 which is capable of generating a beam 44 of electrons having an energy level on the order of 100,000 electron volts and higher. This resonant cavity linear accelerator may be made as described by Hereford in "Journal of Applied Physics," vol. 18, pp. 956–960 (1947). The resonant cavity 40 includes an electron emitter, such as a hot tungsten filament (not shown). The resonant cavity 40 is energized by a pulsed radio frequency generator 42 which, in turn, is controlled by the trigger circuit 28. A tube 43 connected to the resonant cavity 40 provides the path through which the electron beam 44 enters the pipe 10. The pipe 10 adjacent the end of the tube 43 has an extremely thin wall portion 46 therein, this wall portion being sufficiently thick to constitute a vacuum seal for the end of the tube 43, but being sufficiently thin so as not to unduly lower the energy level of the electron beam 44 passing therethrough. Wall portion 46 preferably comprises a thin sheet of aluminum or mica.

In the operation of the device of Fig. 2, the pulsed radio frequency generator 42 is energized to cause the resonant cavity to discharge a beam of high energy electrons into the interior of the pipe 10 with the creating of an ion cloud 13 in the gas flowing through the pipe 10. As the ion cloud reaches the detector 16, the current flowing in the detector 16 is amplified and fed through trigger circuit 28, this trigger circuit then energizing the pulsed radio frequency generator 42 to cause the introduction of another pulse into the resonant cavity 40 for the production of another beam of high energy electrons. The system of Fig. 2 is thus recycling in the same manner as is the system of Fig. 1. The frequency with which the ion clouds are created can be read by the frequency meter 30 or any other suitable means, such as the oscilloscope described in the discussion of Fig. 1.

Referring now to Fig. 4 there is shown still another modification of the means for introducing ionizing energy into the flowing gas stream. In this form of the invention the source of ionizing energy comprises a constantly emitting source, such as radium. This radium, or other radioactive source, is preferably associated with its immediate decay products and is arranged so that its most ionizing radiation (i. e., alpha particles) is normally prevented from entering the gas stream. Means are associated with this radioactive source for directing, when desired, a predetermined amount of the constantly emitted radiation into the flowing gas stream, thereby causing the creation of an ion cloud in this stream. In Fig. 4, where like numbers refer to like elements in the preceding figures, the source of radium 52 is positioned in a slanted holder 50 adjacent the thin window 46 in the wall of the wind tunnel 10. Positioned in the holder 50 are three radiation-absorbing barriers 54, 56 and 58. Barriers 54 and 56 have aligned holes 60 and 62, respectively, therein to permit a narrow beam 64 of radiation to pass therethrough. This narrow beam 64 normally strikes the third barrier 58 and is absorbed by this barrier 58. Barrier 58 is provided with a hole 66 slightly offset from the aligned holes 60 and 62. For bending the narrow beam of radiation 64 to direct it through the hole 66, there is provided an electromagnet schematically indicated at 68. By the application of this strong electromagnetic field across the beam 64, this beam is deflected through the hole 66, through the window 46 and into the flowing gas stream. By the use of the embodiment of the invention shown in Fig. 4, the electromagnet 68 may be periodically energized by means such as the trigger circuit 28, shown in Figs. 1 and 2, so as to create an ion cloud whenever a preceding ion cloud is detected.

In Fig. 5 there is shown a modification of the invention as applied to the measuring of the velocity of an object, such as a projectile or airplane passing through the air. In Fig. 5 where like numbers refer to like elements in the preceding figures, 70 represents a supersonic projectile, such as a rocket, which carries a speed measuring system of the type shown schematically in Fig. 2. In the case of Fig. 5, the ion cloud detector comprises a pair of spaced electrodes 72 and 74 mounted on a wing 76 of the rocket. These electrodes 72 and 74 are preferably flush with the surface of the wing so as not to interfere with the flow of air past wing 76. In addition to the elements previously mentioned in connection with the discussion of Fig. 2, the measuring circuit includes a transmitting meter 78 which can transmit speed data to a ground station. Where the projectile 70 is to carry a pilot, meter 78 may be positioned to indicate air speed directly to the pilot.

In the operation of the device of Fig. 5, resonant cavity 40 is energized by a pulse introduced therein from pulse generator 42, the resonant cavity generating a beam of high energy electrons, these beams passing to the exterior of the rocket forming a long ion cloud 13. As the wing 76 of the rocket enters the ion cloud 13, current is passed between electrodes 72 and 74, this current being amplified by the amplifier 26. The amplified current is fed to the meter 78 and the trigger circuit 28, this latter circuit in turn energizing the pulse generator 42 to cause the emission of a second beam of high energy electrons. The device of Fig. 5 thus gives a direct reading of the speed of the projectile with respect to the air through which it is passing, this speed being a function of the frequency with which the ion clouds 13 are generated.

It should be apparent from the above description of the various aspects of the present invention that numerous modifications thereof may be achieved. For example, the detecting means in the Fig. 1 and Fig. 2 forms of the invention may comprise plate electrodes of the type shown in Fig. 5. Equally, the "keep alive" pulse circuit 36 of Fig. 1 is advantageously included in the circuits of Figs. 2 and 5.

Throughout the specification and in the appended claims, the expression "ionizing energy" has been used. In addition to the examples given, it is intended that other types of energy, such as X-rays, ultraviolet light, and other suitable sources of ionizing energy may be utilized and should be included within this definition.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:

1. Apparatus for measuring the speed of relative movement between an object and a body of gas, said gas, due to said relative movement, moving in a stream past said object, said apparatus comprising means for introducing ionizing energy into said gas stream for a short period of time to create a cloud of ions in said gas stream, said means for introducing ionizing energy comprising a source of high energy electrons which are directed towards said gas stream with an energy level of at least 100,000 electron volts, means predeterminedly spaced downstream from said first-named means for detecting said ion cloud in said gas stream, said short period of time being less than the transit time of said ion cloud from its point of creation to said detecting means at the maximum speed of relative movement to be measured, means connected with said ion-detecting means for amplifying ion currents picked up thereby, a triggering circuit controlled by said amplifying means, a connection between said triggering circuit and said first-named means for causing the creation of a second ion cloud upon the arrival of a first ion cloud at said detecting means, and means connected with said triggering circuit and amplifying means for measuring the frequency of creation of said ion clouds, said frequency being a function of the speed of relative movement between said gas and said object.

2. Apparatus for measuring the speed of relative movement between an object and a body of gas, said gas, due to said relative movement, moving in a stream past said object, said apparatus comprising means for introducing ionizing energy into said gas stream for a short period of time to create a cloud of ions in said gas stream, said means for introducing ionizing energy comprising a source of high energy electrons which are directed towards said gas stream with an energy level of at least 100,000 electron volts, means predeterminedly spaced downstream from said first-named means for detecting said ion cloud in said gas stream, said short period of time being less than the transit time of said ion cloud from its point of creation to said detecting means at the maximum speed of relative movement to be measured, means connected with said ion-detecting means for amplifying ion currents picked up thereby, a triggering circuit controlled by said amplifying means, a connection between said triggering circuit and said first-named means for causing the creation of a second ion cloud upon the arrival of a first ion cloud at said detecting means, means connected with said triggering circuit and amplifying means for measuring the frequency of creation of said ion clouds, said frequency being a function of the speed of relative movement between said gas and said object, means for generating a pulse of energy at a predetermined low repetition rate, and means connecting said pulse generating means with said triggering circuit and said first-named means for causing said pulse to create an ion cloud, said low repetition rate being considerably lower than the frequency representing the slowest speed of relative movement to be measured by said apparatus.

GLENN L. MELLEN.

References Cited in the file of this patent

UNITED STATES PATENTS

| Number | Name | Date |
| --- | --- | --- |
| 2,510,167 | Boothroyd | June 6, 1950 |